United States Patent [19]

Maurer

[11] 4,433,383

[45] Feb. 21, 1984

[54] INSTALLATION COMPRISING A PLURALITY OF NUMERICALLY CONTROLLED MACHINE TOOLS

[76] Inventor: Roger Maurer, Rue du 11 Novembre, 74460 Marnaz, France

[21] Appl. No.: 221,216

[22] Filed: Dec. 30, 1980

[30] Foreign Application Priority Data

Dec. 27, 1979 [CH] Switzerland ............... 11456/79

[51] Int. Cl.³ ............... G05B 19/417; G06F 15/46
[52] U.S. Cl. ............... 364/474; 318/562; 364/138
[58] Field of Search ............... 364/474, 475, 131, 132, 364/136, 138, 200 MS File, 900 MS File, 167–171; 318/562; 340/825.23

[56] References Cited

U.S. PATENT DOCUMENTS

| | | | |
|---|---|---|---|
| 3,626,385 | 12/1971 | Bouman | 364/138 X |
| 4,029,950 | 6/1977 | Haga | 364/474 X |
| 4,034,354 | 7/1977 | Simmons | 364/136 X |
| 4,071,911 | 1/1978 | Mazur | 364/138 X |
| 4,141,066 | 2/1979 | Keiles | 364/187 X |
| 4,288,849 | 9/1981 | Yoshida et al. | 364/474 X |

*Primary Examiner*—Joseph F. Ruggiero
*Attorney, Agent, or Firm*—Robert E. Burns; Emmanuel J. Lobato; Bruce L. Adams

[57] ABSTRACT

Numerical control installation making it possible to monitor N machine tools each comprising n motors to be monitored in accordance with a desired independent program. The single monitor device (C) comprises a data input station (1), a minicomputer (2), an interface equipment (8) composed of N interface units (8A to 8N) connected by a bus (7) to the minicomputer. Each unit (8A to 8N) is assigned to a machine tool (9A to 9N) and comprises an interface circuit (10) of 2n bits having n sections (10a to 10n) for monitoring each of the n motors (12a to 12n) of a machine. Each machine (10a to 10n) is extended by a monitor integrated circuit (11a to 11n) assigned to each motor for all the comparison operations.

7 Claims, 4 Drawing Figures

INSTALLATION COMPRISING A PLURALITY OF NUMERICALLY CONTROLLED MACHINE TOOLS

FIELD OF THE INVENTION

The object of the present invention is an installation comprising N machine tools which are numerically controlled by a computer which is common to all the machine tools, each machine having a number n of motors to be monitored and controlled, the installation furthermore comprising a data and program input station, monitoring means for controlling each machine in accordance with an independent desired program and N interface units connected by at least one bus to the computer, each unit being assigned and adapted to one of the machine tools and comprising n sections for the monitoring of each of the n motors of a machine tool.

BACKGROUND OF THE INVENTION

In the field of machine tools numerical controls which can be adapted to a single machine at a time have been developed up to now. Each machine, therefore, has its own numerical control, consisting of an automaton comprising a digital computer and a monitoring unit and having a fixed program. With this type of device one cannot in general monitor and operate more than two spindles simultaneously and therefore it does not make it possible to carry out more than two operations at a time. The cost of such machines is therefore relatively high since they each have their own automaton.

Such machine tools are known and described for instance in U.S. Pat. No. 4,124,887 and French Patent No. 2 228 247, in accordance with which there is present, incorporated in each machine tool, a computer which is specific to them, and their own tape reader which controls said machine and in which only the monitoring is effected by a centralized computer.

Since the twenty years that these numerical controls have been developed their efficiency has improved greatly, particularly during the last few years in which microprocessors have been introduced as numerical control, but the general philosophy of these machines has still remained limited to the concept of unit machine tools each having its own automaton. Therefore, in a shop equipped with several machine tools, for instance twenty machine tools, each of these tools has its own automaton which requires the presence of a large number of skilled workers. Furthermore, the present machines with their automatons are very expensive despite the advances made in microprocessors; they are generally reserved, in order to have sufficient output, to the manufacture of parts of very high quality and therefore for limited series and in principle it is not profitable to use them for the manufacture of large series of parts.

Up to now, one never had the idea of centralizing all the numerical controls in a single computer, despite the fact that there is at present a need for such streamlining, as indicated above. The reasons for this lack can be imputed, on the one hand, to the fact that the field of machine tools is a rather self-contained traditional field having few relations with the field of electronics, and, on the other hand, it was believed that numerous difficulties in production had to be surmounted.

At first sight one could imagine that with the arrival of microprocessors on the market these microprocessors would lend themselves to such centralization of the control. Unfortunately, this is not possible and if anyone has tried to apply microprocessors for this he will certainly have come up against great difficulties since, due to their configuration, microprocessors do not lend themselves to the effecting of such centralization.

SUMMARY OF THE INVENTION

The object of the present invention is to design a profitable installation which in addition to numerous other possibilities also offers itself for manufacture in large numbers at low cost.

For this purpose, the installation in accordance with the invention is characterized by the fact that the computer is a minicomputer operating in real time which forms with the input station a single centralized system for simultaneously controlling all the N machine tools and all the n motors of each machine tool, this minicomputer being adapted to transmit all the work commands and the respective condition verification signal and for this purpose it is equipped with an interrupt system having a maximum context change time of 900 ns and a cycle time which is only a fraction of the context change time, at most one-fifth, and comprises a central memory as working storage, possibly supplemented by an external working storage to store all the work programs to be carried out, by the fact that each interface circuit which comprises the said n sections is a circuit of at least 2n bits and by the fact that for relieving the minicomputer from the function of individual monitoring of the motors there is provided, connected to the output of each of the said sections, a monitor integrated circuit assigned and adapted to each motor for all the condition and comparison functions, it being controlled directly by the said minicomputer, all the identification lines of each of said sections being connected by a common identification line.

It was therefore recognized that it was necessary to use a minicomputer of the type indicated, which is the only one capable of fulfilling the complex functions, and not only microprocessors.

What proved essential in order to find a solution to the problem in question was the selection of the context change time of 900 ns maximum and the cycle time of only one-fifth of the context change time, i.e. about 180 ns. These conditions are, in fact, absolutely necessary in order to arrive at a rationalization of the work so that the control and the verification can be effected practically simultaneously. By way of example, it must be borne in mind that the performance of an individual operation by the motor of a machine requires a time of about 15 ms which breaks down to about 9 to 11 ms for the physical displacement off the motor and of the tool respectively, and 6 to 4 ms for the processing of the data in the minicomputer. With the installation in accordance with the invention, in order to effect eight different operations practically simultaneously a maximum cycle time of 180 ns is required.

The state of the art known up to the present time has provided no suggestion for achieving this purpose since in U.S. Pat. No. 4,124,887 it is indicated that the cycle time may vary between 0.5 and 10 ms. As a general rule, in the known installations in which a computer drives a single machine, one typically finds about 700 ns as cycle change time and 30 us as context change time.

Furthermore, an important point for the making of the present invention was to find that the verification unit which up to then was always incorporated in each automaton of each machine is not to be incorporated in the minicomputer but rather provided as an integrated circuit or chip, between each equipment interface and each motor of a machine tool.

This installation has numerous advantages: First of all, from a financial standpoint: Considering that a conventional cam machine costs about Francs 80,000 and that a numerical control machine offering the same possibilities with respect to the parts to be machined costs about Francs 200,000, the parts produced with this latter machine for an identical series have an excessively high cost as compared with that obtained with the conventional cam machines. Therefore by eliminating the digital computers customarily associated with each machine tool and using a single numerical control, which costs about Francs 80,000, for several machines the unit cost of which comes down to about Francs 120,000, one easily realizes that the more one increases the number of machines controlled by the same unit the more one decreases their cost and therefore the greater the profitability of the installation.

With such an installation, the programming, the verification and the security are executed from a single console by a single employee. The possibilities of storage on floppy disks or hard disks of X programs are unlimited.

Furthermore, the creations, the modifications in real time, are visually displayed and the conventional punched tape is eliminated.

With such an installation it is possible to control simultaneously, for instance, up to 64 machines with, for instance, 8 simultaneous operations per machine, which number is, of course, not limitative, as a function of the new techniques to come.

By this unique centralized verification one can assure simultaneously, in addition to the control and operation, also the safety, the simultaneous handling of the manufacturing plans, the management, manufacturing and supply programs and even possibly training, teaching by simulation, and therefore without additional cost or risks but under conditions identical to actuality.

BRIEF DESCRIPTION OF DRAWING

The accompanying drawing shows by way of example one diagram for the establishing of the installation in accordance with the invention.

DESCRIPTION OF PREFERRED EMBODIMENT

Figure 1:
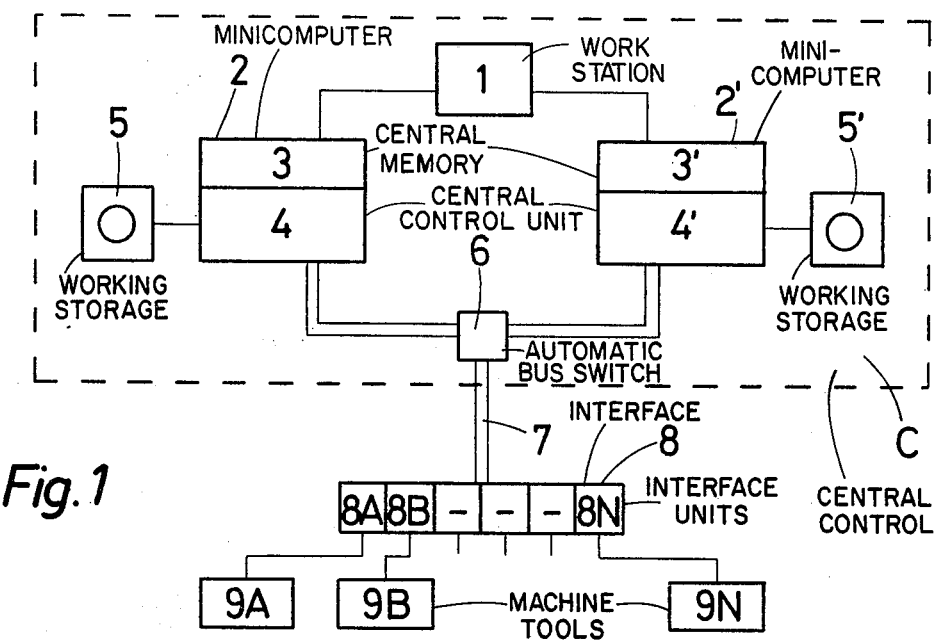
FIG. 1 is a block diagram of the general installation.

The installation comprises a centralized control device C comprising a station 1 for the input of the work data and programs, a minicomputer 2 with a real time function and an interrupt system and a working storage 5 formed as supplement, by replaceable floppy disks which bear the work programs desired for the machines. The input station 1 is equipped with a control desk, a screen and a printer affording the possibility of processing the business data. The minicomputer 2, the main elements of which are a central memory 3 and a central control unit 4, is selected in such a manner as to have a cycle time of 180 ns and a context change time of 900 ns.

The minicomputer 2 is intended to control simultaneously N machine tools, the number of which machines may vary from 1 to 64, the number contemplated in the example in question, each machine in its turn having n motors, the number of motors per machine being 8 in the example selected.

A reserve second minicomputer 2' is provided comprising the same elements 3', 4' as the minicomputer 2 and an identical memory 5' for reasons of security in case of misoperation of the first minicomputer 2. This second minicomputer and the memory operate in known manner in synchronism with the first so that the two units can be substituted for each other. The two minicomputers 2, 2' are connected to the transmission bus 7 by an automatic bus switch 6 which permits the automatic switching of one or the other minicomputer to this bus 7.

The transmission of the information coming from the control device C is effected via this bus 7 to interface equipment 8 having N interface units 8A to 8N. Each interface unit 8A to 8N is assigned and adapted to an equal number of machine tools 9A to 9N. This assembly of machine tools comprises possibly several single or multispindle machine tools with fixed or movable stock and a plurality of tools.

Figure 2:
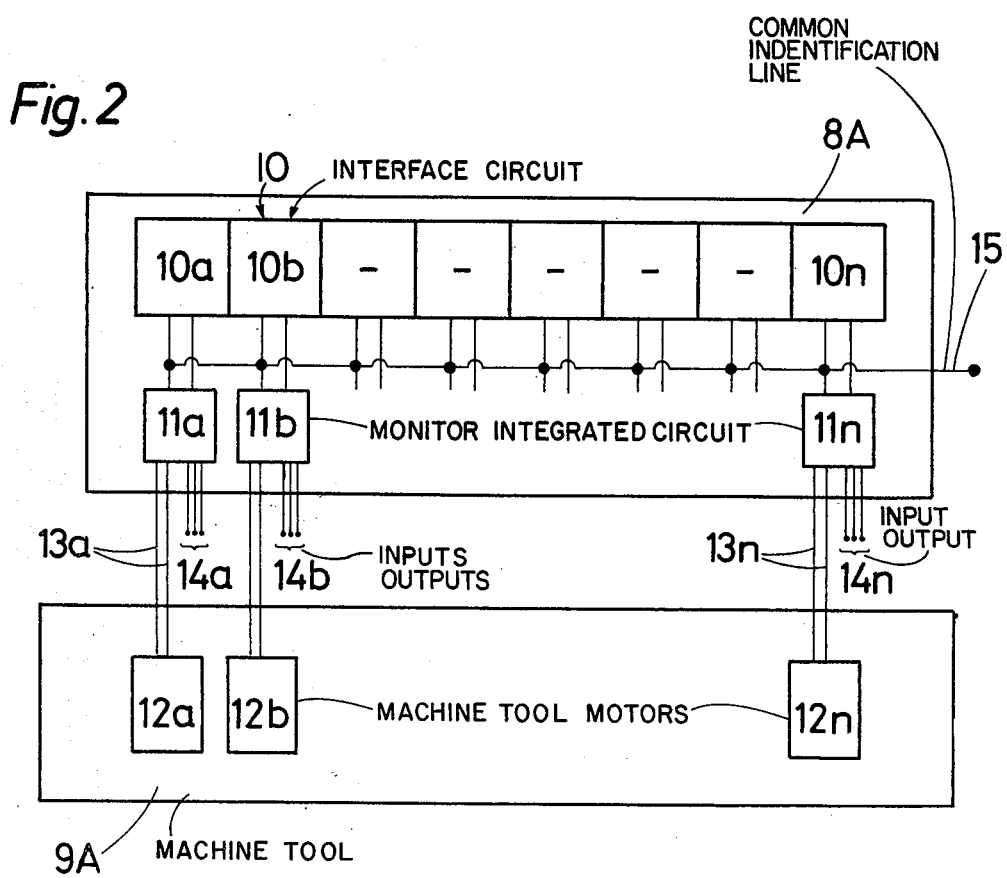
FIG. 2 is an embodiment of a single interface unit 8A.

Referring to FIG. 2 one embodiment of an interface unit 8A will now be described. This unit comprises a standard interface circuit 10 of 16 bits as available on the market, having n interface sections 10a to 10n formed by a chip or integrated circuit, the said number n corresponding to the number of motors to be controlled or the number of spindles to be controlled for one machine respectively. In the example considered, eight interface sections are provided.

Each interface section 10a to 10n has two outputs connected to a monitor integrated circuit 11a to 11n consisting of a control chip, each of them being assigned to one of the motors 12a to 12n of the same machine. Each monitor integrated circuit 11a to 11n is connected to the motor 12a to 12n which is associated with it by means of two channels 13a in known manner, providing the output identification and the safety interrupt. Each monitor integrated circuit is provided furthermore in known manner with three outputs 14a to 14n connected to the minicomputer 2, 2' respectively, namely a first output having the function "read the data line," a second output having the function "load the check word" and finally a third output having the function "read the states."

A common identification line 15 is connected to the analogous identification lines of the other interface units. The purpose of this identification line is to synchronize the different motors of a machine tool, therefore the monitor unit as a function, on the one hand, of the real time programming and therefore of the state and on the other hand of the interrupt system in order logically to split the monitoring on the one hand and the entered values on the other hand.

Figure 3:
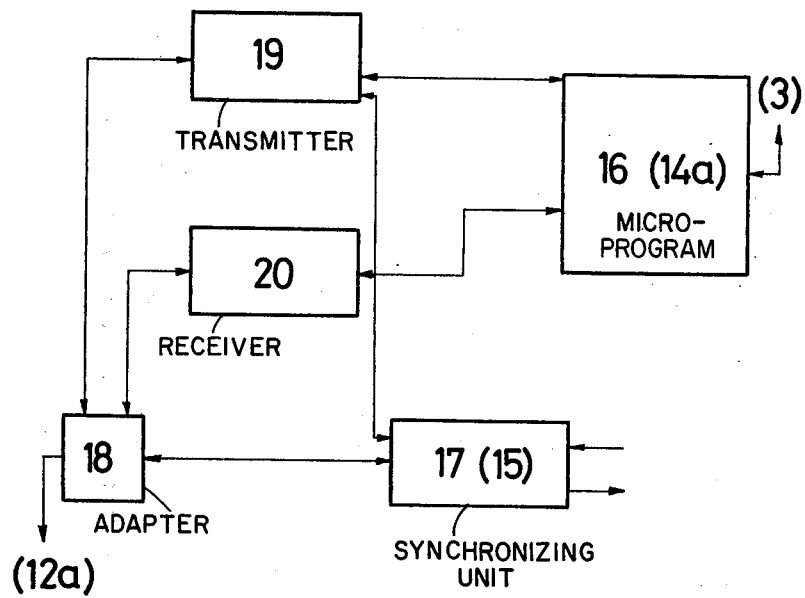
FIG. 3 shows the general diagram of an integrated motor-monitor integrated circuit.

Each monitor integrated circuit 11a to 11n is developed, for instance, in the manner shown diagrammatically in FIG. 3.

The outputs 14a which are connected directly to the minicomputers 2 and 2' in themselves constitute a microcomputer 16 the essential function of which is to read the data coming from the memories 3 and 3' of the minicomputers 2 and 2' respectively, the change of the check word as well as the tests and functions relative to this check word and finally the management (reading, verification, etc.) of the states in connection with the common identification line 15 which has the function of synchronizing the different monitor units with due consideration of each "state" and "check".

In the general diagram of the circuit shown in FIG. 3, this function is represented by the section 17 which receives the control signals and sends the interrupt states to the "input/output" bus. The connection with the motor 12a in question by the channels 13a is effected by an adapter 18 having the function of identification of output towards the motor in question and safety interrupt. The transmission of the information is effected via a transmitter 19 and a receiver 20. On the "input/output" bus the input effects the reading of the characters which are grouped in a word of 16 bits and stored in the memory while on the output there is effected the reading of the 16 bits in the memory divided into octets and transferred towards the data register, as well as the supervision of the states on the output channel.

The transmission and reception are carried out in conventional manner by means of AND and OR circuits. They permit completely parallel and synchronized functioning on the one hand of the controls and checks of each machine and on the other hand of the controls and checks of n machines simultaneously. Each transmitter and each receiver is connected to the line adapters 18a to 18n themselves controlling n motors 12a to 12n of each machine. The "program" data and "state" data of each program and of each machine effected via the common line 15 are checked by the state indicators which themselves are connected to two different interrupt levels of the computer, this making it possible to safeguard the parallel operation between transmitter and receiver. Each receiver and each transmitter are furthermore also connected directly and individually to the memories 3 and 3' respectively of the minicomputers 2 and 2' respectively for the reading and recording respectively of the data.

Figure 4:
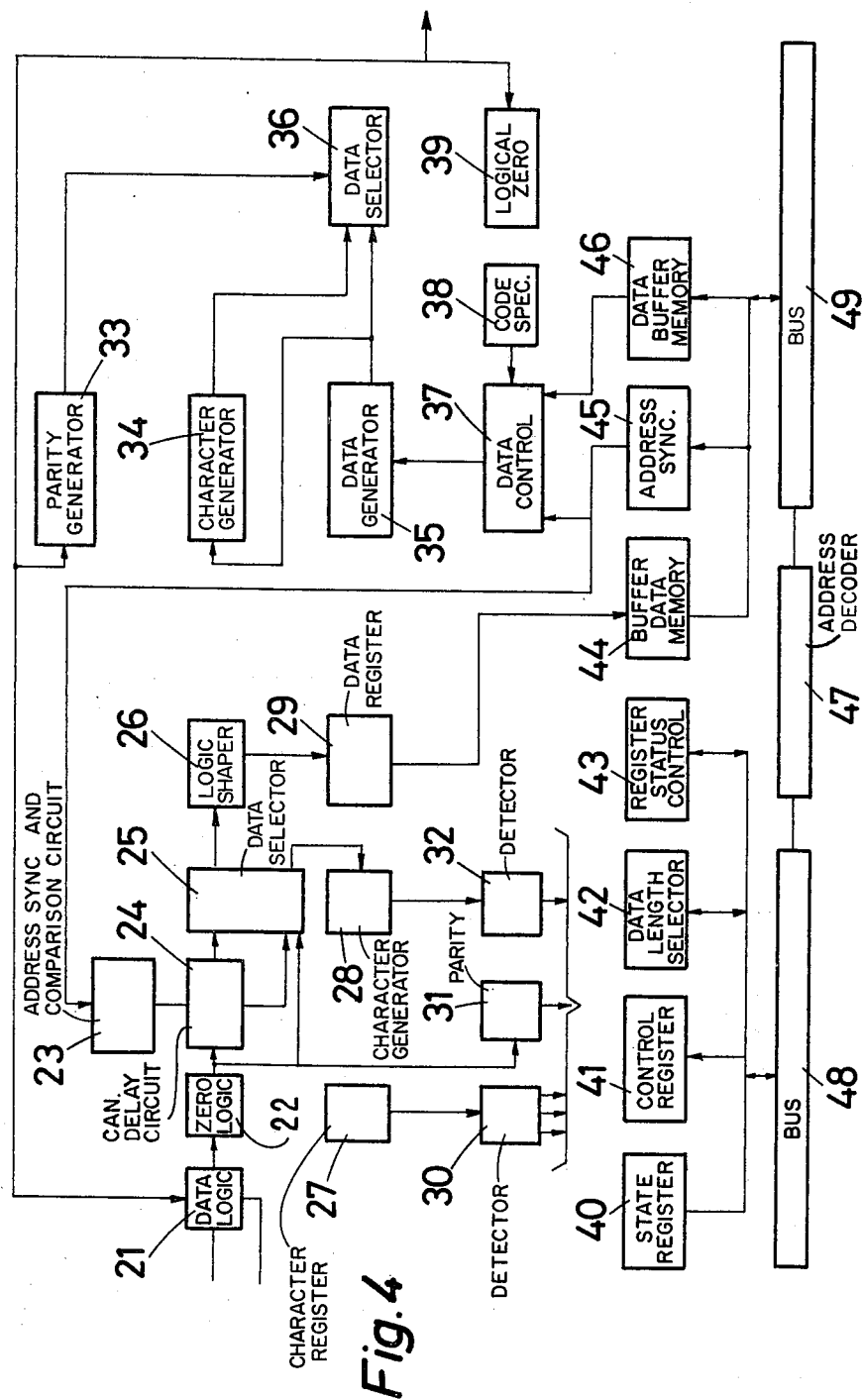
FIG. 4 represents the functional diagram of the microcomputer part of FIG. 3.

The microcomputer 16 or more precisely the microprogrammed management of the monitor units 11a to 11n is shown in FIG. 4 which is composed of the following circuits:

| | |
|---|---|
| 21 | data logic |
| 22 | zero logic |
| 23 | address synchronization and comparison circuit |
| 24 | canonical delay circuit |
| 25 | data selector |
| 26 | logic shaper |
| 27 | character register |
| 28 | character generator |
| 29 | data register |
| 30 | detector |
| 31 | parity |
| 32 | detector |
| 33 | parity generator |
| 34 | character generator |
| 35 | data generator |
| 36 | data selector |
| 37 | data check |
| 38 | code specification |
| 39 | logical zero |
| 40 | state register |
| 41 | check register |
| 42 | data length selector |
| 43 | register status check |
| 44 | buffer data memory |
| 45 | address synchronizer |
| 46 | data buffer memory |
| 47 | address decoder |
| 48/49 | bus |

The processing of the instructions and therefore the control of the machines are effected from an interface 8 parallelly and simultaneously.

The invention resides particularly in the fact that due to the installation in accordance with the invention it has been possible to satisfy the condition that the sum of the times necessary to control each machine, each comprising eight motors, is less than the sum of the times necessary for the central control unit to process this information.

It has been possible to achieve this due to the fact that there has been selected a minicomputer of the type mentioned and not microprocessors which do not satisfy these conditions, and furthermore that this minicomputer has been relieved of the function of the individual monitoring of the motors of a machine by the introduction of each interface associated with a tool machine of eight identical check chips which fulfill this function which consists principally in assuring all the comparisons: (1) comparison of the state of the motor with respect to the real time program; (2) comparison of the motor with respect to the state of the other motors of the same machine; (3) comparison of the synchronism with respect to the real time program. Up to now, in the numerical controls of conventional machines these three functions were effected by the digital computer forming part of each machine. By the present invention, the carrying out of these functions has been shifted to the output of each section of the stand and interface circuit assigned to each motor of a machine so that it is not the minicomputer which must process these functions in the form of programs (software). It is only by avoiding for the computer the necessity of processing these functions that one arrives at reasonable working times.

Furthermore, with the installation in accordance with the invention one uses a general control algorithm for the dc motors having an open-loop state with return of state while in the conventional machines one used a closed loop or semi-closed loop algorithm. The algorithm takes into account the comparison part or the interface level. This makes it possible to produce geometric shapes which were impossible to achieve with such machine tools up to now, for instance, spheres, ogives, cones, etc. The control algorithm is distributed over units 3 and 4, a part of this algorithm being microprogrammed.

Furthermore, the minicomputer is preferably equipped with a screen and a printer, which also make it possible to handle the production plans, stocks, supply and even to assure training and education by simulation and therefore without expense or risk but under conditions identical to actuality.

Preferably, floppy disks are used as working program supports in place of the punched tapes used up to now in the conventional machines. As a matter of fact, these disks may be handled more easily and the programming can also be effected more easily.

Summarizing, due to this invention one succeeds in assuring simultaneously the control, operation and security by a single main control unit, and this for a plurality of machines.

The installation can furthermore serve as simulator permitting the training and educating of the persons who are to use the equipment. Furthermore, one can assure in parallel the management of the manufacturing plans and the management manufacture and supply programs. A single person is sufficient to carry out with full security a given number of manufacturing programs on a given number of machine tools.

Of course, the number N of machine tools and n of motors per machine tool may be selected arbitrarily but due to the nature of the minicomputers and of the interface chips available on the market, the installation in accordance with the invention is designed for a capacity of 64 machines each having 8 motors.

Furtherore this installation affords the possibility of the companies commencing their installation with n machines and increasing this number of machines as requirements increase by then obtaining new machines without automaton and therefore cheaper, which can be connected to the central unit without additional expense. It is obvious that the greater the number of machines centralized on the same control device the greater the efficiency of the installation.

I claim:

1. An installation comprising N machine tools numerically controlled by a computer common to all of the machine tools, each machine tool having n motors to be monitored and controlled, said installation further comprising a data and program input station, monitor means for controlling each machine in accordance with a desired independent program and N interface units connected by at least one bus to said computer, said units being allocated and adapted to individual ones of said machines tool, characterized by the fact that said computer is a minicomputer operating in real time which together with said input station comprises a single centralized control device for simultaneously controlling all N machine tools and all n motors of each machine tool, said minicomputers being adapted to transmit all work commands and all check and state signals respectively, and having a maximum context switching time of 900 ns and a cycle time which is no more than one-fifth of the context switching time, and comprises a central memory as a working storage to store all work programs to be run, and further characterized by the fact that each interface circuit comprises n sections for checking each of the n motors of a machine tool and is a circuit of at least 2n bits, and a monitor integrated circuit connected to the output of each of said sections and assigned and adapted to each motor for all comparison and state functions controlled directly by said minicomputer, and a common identification line connecting all identification lines of said sections.

2. An installation according to claim 1, characterized by the fact that each monitor integrated circuit consists of a control chip, and each interface section has two outputs connected to said monitor integrated circuit, and each monitor integrated circuit is connected to the respective motor by two channels providing output identification and safety interrupt and is provided with three outputs connected to said minicomputer, namely a first output having the function "read the data line", a second output having the function "load the checkword" and a third output having the function "read the states".

3. An installation according to claim 1, characterized that by the fact that said working storage of said minicomputer is supplemented with an external working storage.

4. An installation according to claim 3, characterized by the fact that the external working storage (5) consists of floppy disks.

5. An installation according to claim 1, characterized by the fact that each interface circuit (10) is a standard 16-bit interface circuit of TTL technology.

6. An installation according to claim 1, characterized by the fact that there is provided a second identical reserve minicomputer (2') having a central memory (3') identical to the memory of the first minicomputer (2), the first (2) and second (2') minicomputers being connected via an automatic bus switch (6) to said bus (7).

7. An installation according to claim 1, characterized by the fact that the input station (1) is provided with a desk with screen and printer making it possible to process other data.

* * * * *